United States Patent
Lipka et al.

(10) Patent No.: US 11,982,256 B2
(45) Date of Patent: May 14, 2024

(54) WIND TURBINE ROTOR BLADE AND METHOD

(71) Applicant: Nordex Energy SE & Co. KG, Hamburg (DE)

(72) Inventors: Thomas Lipka, Rostock (DE); Gerald Festner, Klein Krams (DE); Adam Raczynski, Ahrensburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 17/727,472

(22) Filed: Apr. 22, 2022

(65) Prior Publication Data
US 2022/0341390 A1 Oct. 27, 2022

(30) Foreign Application Priority Data
Apr. 26, 2021 (EP) .................... 21170458

(51) Int. Cl.
*F03D 1/06* (2006.01)
*F03D 80/30* (2016.01)

(52) U.S. Cl.
CPC .......... *F03D 1/0675* (2013.01); *F03D 80/30* (2016.05); *F05B 2230/60* (2013.01); *F05B 2240/302* (2013.01); *F05B 2260/301* (2013.01)

(58) Field of Classification Search
CPC ...... F03D 1/0675; F03D 80/30; F03D 1/0677; F03D 1/0679; F03D 1/0681;
(Continued)

(56) References Cited

U.S. PATENT DOCUMENTS

2010/0272570 A1* 10/2010 Arocena De La Rua ................. F03D 80/30 416/146 R
2014/0334934 A1* 11/2014 Kannenberg .......... F03D 1/0675 416/217
(Continued)

FOREIGN PATENT DOCUMENTS

| CN | 110637158 A | 12/2019 |
|---|---|---|
| WO | 2015/124568 A1 | 8/2015 |

(Continued)

OTHER PUBLICATIONS

Closed_Open Cell Sponge Rubber_Custom Gasket Manufacturing—Aug. 11, 2020 (Year: 2020).*

(Continued)

*Primary Examiner* — Brian Christopher Delrue
(74) *Attorney, Agent, or Firm* — Walter Ottesen, P.A.

(57) ABSTRACT

The disclosure concerns a segmented wind turbine rotor blade, which is formed by at least two rotor blade segments, wherein at a division area of the wind turbine rotor blade the segments are firmly connected together at respective connection ends via a plurality of connecting elements, wherein a gap is formed between the connection ends, and a fairing is attached to the segments at the division area, the fairing covering the gap and the connecting elements; wherein the fairing is divided into at least two separate fairing sections, the fairing sections are coupled together at coupling regions at the pressure side and/or at the suction side of the rotor blade, and the coupling regions are spaced apart from the trailing edge or leading edge. The disclosure also concerns a method.

19 Claims, 11 Drawing Sheets

(58) Field of Classification Search
CPC .... F03D 1/0682; F03D 1/0684; F03D 1/0685; F03D 1/0687; F03D 1/0688; F03D 1/069; F03D 80/301; F05B 2230/60; F05B 2240/302; F05B 2260/301; F05B 2240/30; Y02E 10/72
See application file for complete search history.

(56) References Cited

U.S. PATENT DOCUMENTS

2017/0045032 A1    2/2017  Jacobsen et al.
2017/0234296 A1*   8/2017  Garm ................. B29C 70/30
                                             428/137
2019/0338750 A1*  11/2019  Bech .................. F03D 1/0675
2021/0088024 A1    3/2021  Godenau et al.

FOREIGN PATENT DOCUMENTS

WO      2018/121826 A1     7/2018
WO      2019/206386 A1    10/2019
WO      2020084052 A1      4/2020
WO      2020231835 A1     11/2020
WO   WO-2021078347 A1 *   4/2021   ......... B29C 65/4835

OTHER PUBLICATIONS

Extended European Search Report of the European Patent Office dated Oct. 6, 2021 for European application 21170458.0 on which this application is based.

* cited by examiner

WIND TURBINE ROTOR BLADE AND METHOD

CROSS REFERENCE TO RELATED APPLICATION

This application claims priority of European patent application no. 21170458.0, filed Apr. 26, 2021, the entire content of which is incorporated herein by reference.

TECHNICAL FIELD

The disclosure concerns a wind turbine rotor blade with at least two rotor blade segments and a method.

BACKGROUND

Wind turbines with wind turbine rotor blades are widely known from the state of the art and are used to convert wind energy into electrical energy. Wind turbines comprise a multitude of components which are connected to each other, for example via a flange connection. For example, in the area of a rotor blade root, the rotor blades comprise a rotor blade connection with a number of connecting means integrated into the laminate, via which the rotor blades are connected to a bearing ring of a so-called pitch bearing or to a component connected to the bearing ring, such as a so-called extender of the wind turbine, via fastening screws or fastening bolts. The connecting means can, for example, be configured as transverse bolts or bushings and be part of a flange insert for the rotor blade connection. Such a configuration is known from international application WO 2015/124568 A1.

The above-described connections are also used for connecting rotor blade segments which, arranged and joined together lengthwise, form an entire rotor blade. Such a rotor blade is called a split or segmented rotor blade. For example, connecting means are then located in the laminate of a respective connection end or dividing flange of the rotor blade segments. The rotor blade segments can be connected to each other via bolts either directly or via suitable intermediate pieces.

Segmented rotor blades are preferred especially for transport reasons and are becoming increasingly important, especially due to the increasing overall length of rotor blades.

At the separation area of such segmented rotor blades there typically exists a gap, for example, an open gap of approximately 100 mm to 300 mm.

SUMMARY

It is an object of the disclosure to provide a concept for segmented rotor blades that enables a reliable protection and covering of the gap, for example, in order to resist environmental impacts. Further, a high degree of ease of assembly and disassembly in the field should be possible, for example, during maintenance work on the wind turbine.

According to a first aspect a wind turbine rotor blade is disclosed, which is formed by at least two rotor blade segments. At a division area of the wind turbine rotor blade the segments are firmly connected together at respective connection ends via a plurality of connecting elements. A gap is formed between the connection ends.

For example, within the gap the connecting elements are arranged to couple the segments. In other words, the gap is partially bridged by the connecting elements at portions of the division area. A fairing is attached to the segments at the division area, the fairing covering the gap and the connecting elements. The fairing is divided into at least two separate fairing sections. The fairing sections are coupled together at coupling regions at the pressure side and/or at the suction side of the rotor blade. The coupling regions are spaced apart from the trailing edge or leading edge.

For connecting the two rotor blade segments of a wind turbine rotor blade, typically there are provided a large number of mechanical connections, for example, via bolt connections between the two segments. The assembly is configured in such a way that connecting bolts are first screwed into a connection end of one rotor blade segment, for example, into bushings. Then, for example, sleeve-shaped pressure pieces and/or other elements are provided, for example, pushed onto the connecting bolts, before the free ends of the connecting bolts are threaded into the other rotor blade segment and at least partially screwed in. Finally, the two rotor blade segments are mounted together, whereby the connection is firmly screw-bolted and pretensioned using an assembly tool. For example, the pressure pieces and/or other elements are clamped between the rotor blade segments.

The disclosed wind turbine rotor blade provides that a very simple field assembly via a single standard tool (wrench) is possible. Further, an efficient solution of attaching this fairing to already existing system structures is possible, so no work has to happen in the factory, that is, extra blade attachments such as bearing blocks or similar including their measurement and bonding to the rotor blade structure can be dispensed with. In addition, a receptor effect can be achieved by connecting the parts of the fairing to the lightning protection system.

The described rotor blade provides that the open gap at the division area between the connection ends is covered by the fairing. The fairing provides that the aerodynamic outer structure of the rotor blade can be maintained such that the suction and pressure sides could generate a pressure difference and an aerodynamic performance can be achieved at this division area. The mechanical connection between the segments, for example, the bolt connection, is protected by the fairing from environmental conditions, wherein corrosion and water ingress into the interior of the rotor blade can be avoided or is drastically reduced.

The fairing is separated into at least two fairing sections, which are connected to the segments and/or each other such that an entire fairing is formed. The fairing runs along the profile contour of the rotor blade. The fairing sections are connected such that the coupling regions, also named separation points or overlap regions, along the profile contour are spaced apart from the trailing and leading edge of the rotor blade. Thus the fairing sections are not connected together at the trailing and/or leading edge. In these coupling regions a mechanical connection between the fairing sections can be provided, for example, via screw or bolt elements. The fairing enables a high degree of ease of assembly in the field and also offers the possibility of disassembly during maintenance work on the wind turbine. In particular, the coupling regions can thus be placed in regions where the mechanical connections have no or only little influence on an aerodynamical/aeroacoustical performance of the blade. In other words, the position of the coupling regions away from the trailing/leading edges allows an airflow to be well guided over the suction and pressure sides. Further, influences on a sealing between the fairing sections and/or between the fairing sections and the rotor blade segments are reduced. In particular, the coupling regions can be placed outside of main pressure (positive and negative pressure) regions of the blade, in which pressure forces mainly act during operation of the rotor blade of a wind turbine.

For example, in a coupling region two fairing sections overlap each other. This means, an end of a fairing section overlaps another end of the other, adjacent fairing section. Thus, a step created between the two fairing sections (also named fairing segments) is thus placed away from the aerodynamically effective pressure areas and does not interfere with the air flow around this area of the profile. Further, a sealing used in this area is also not subjected to the high pressures prevailing there during operation.

The fairing runs along the profile, that is, the entire profile contour of the rotor blade. In other words, the fairing extends on both pressure and suction side from trailing to leading edge and forms a closed ring or loop in assembled state. The fairing has an aerodynamic profile that essentially corresponds to the aerodynamic profile of adjacent blade. The term "essentially" also includes the areas or interfaces at transitions to other components of the rotor blade, especially the two segments, for example, like steps or the like. The fairing includes at least two sections or segments (ring sections/segments), which are coupled together. Each fairing section is formed in one-piece. For example, the fairing sections overlap in the coupling regions, wherein exemplarily one or more steps are formed.

It is aerodynamically and aeroacoustically advantageous to set as few coupling regions as possible, but at least one coupling region on each of suction and pressure side would be useful for sealing, assembly and manufacturing reasons.

Since the coupling regions are spaced apart from the trailing and leading edge of the blade, a first fairing section includes the trailing edge and a second fairing section includes the leading edge. Thus, the first and second section each run from the pressure side over the respective trailing or leading edge to the suction side.

According to an embodiment, the coupling regions are arranged outside of essential positive or negative pressure regions, in particular a pressure region i) close to the leading edge on the suction side, ii) close to the leading edge on the pressure side and iii) between the trailing edge and a maximum profile height on the pressure side. It is provided to place the coupling regions of the fairing away from these pressure areas. For example it is thus possible to place a step between the two fairing segments away from the aerodynamically effective pressure areas so that the flow is not disturbed in this area of the profile. Also, a seal used in the coupling region is not subjected to the high pressures prevailing there.

An essential pressure region is defined as a region, where certain pressure conditions prevail during operation of the wind turbine and rotor blades. In particular, in such regions a pressure difference between maximum pressure areas on suction and pressure side of the rotor blade is approx. between +/−0.08 bar to 0.1 bar. For example, with regard to an ambient pressure (for example, approx. 1 bar) there might be essential pressure areas of approx. 0.945 bar, 1.015 bar or 1.025 bar for example. In particular, there are three notable pressure areas on the profile cross-section of the segmented blade, a negative pressure area on the suction side near the leading edge, an overpressure area on the pressure side near the leading edge and an overpressure area on the pressure side between trailing edge and a maximum profile height. Following these essential pressure areas, the inventors defined length sections a) to c) in which the fairing should be divided or coupled:

Length section "a" extends on the suction side between the trailing edge and a location of the maximum profile height.

Length section "b" is located on the pressure side in an area between 15% and 65% of the chord length measured from the leading edge.

Length section "c" is located on the pressure side between the trailing edge and 80% of the chord length measured from the leading edge.

According to an embodiment, two fairing sections overlap in a respective coupling region such that a step is formed transverse to a flow direction of air during an operation of the rotor blade, over which step the air flows downwardly during the operation of the rotor blade. In general, each fairing section overlaps with another fairing section. In other words, each fairing section has two ends and each end overlaps with a respective end of another section. The sections are arranged such that the air flows downstream the step. This is advantageous with regard to aerodynamic reasons.

According to an embodiment, a height of the step is 3 mm or less, in particular 2.5 mm, 2 mm or less. This contributes to a very good aerodynamic performance. The height exemplarily corresponds to a wall thickness of the second fairing section, at least at the coupling region.

According to an embodiment, the step tapers with an angle less than 15 degrees. This contributes to a very good aerodynamic performance.

Optionally, a width of the fairing decreases downstream over the length of the fairing along the profile contour.

According to an embodiment, a first fairing section of the fairing includes a trailing edge. In this embodiment the coupling regions of the first fairing section are preferably arranged on both suction and pressure side close to the trailing edge (for example, 200 mm to 500 mm). In order to keep the first fairing section ("trailing edge fairing") as short as possible, the necessary coupling regions of the first fairing section should be located as close as possible to the trailing edge and preferably opposite each other on suction side and pressure side. This allows that this somewhat more complex geometric area of the trailing edge can be produced economically and in a variety of ways. For example, integral fiber composite structures, differential fiber composite structures, metallic joining processes in the case of lightning receptor suitability or plastic injection molding processes are possible and can offer a commercial advantage here, depending on the configuration, requirements and required number of units, if the first fairing section is small in its dimensions. For example, the first fairing section accounts for 20% or less of the length of the entire fairing, that is, a length of the fairing along the profile contour.

According to an embodiment, the first fairing section includes the trailing edge and is made from metal, for example, a metal casting or metal cast element. Preferably, the metal first fairing section is electrically coupled to a lightning protection system and thus serves as a lightning receptor. Thus a very effective lightning receptor located directly in the division area is provided, since the whole first fairing section is used, which provides a large attack surface for a lightning strike.

According to an embodiment, the first fairing section of the fairing includes a trailing edge, wherein the trailing edge tapers with an angle less than 15 degrees. Thus, the stage of the rotor blade structure to the environment is optimized. It is referred to the above mentioned advantages and effects.

According to an embodiment, the first fairing section includes a drainage opening. For drainage of water at the division area, one or more drainage openings can be provided in the trailing edge and/or on the suction side of the first fairing section. In other words, such openings are open on the trailing edge suction side towards the outside. In the case a drainage opening extends towards the tip of the trailing edge such an opening does not interfere with the pressure gradient between suction and pressure sides. In the case a drainage opening extends to the suction side the negative pressure gradient at the suction side would support the water drainage.

According to an embodiment, the fairing includes only the first fairing section and a second fairing section, wherein the first fairing section includes the trailing edge and the second fairing section includes the leading edge. Thus, only few coupling or separation regions are provided.

According to an embodiment, the second fairing section accounts for 80% or more of the length of the entire fairing. This allows for a very large second fairing section, which can be formed in a very simple manner. This contributes to an efficient production, amongst others. The length refers to a profile contour of the fairing or a main extension direction.

For example, the second fairing section has a constant cross-section along its length. For example, the second fairing section has a wall thickness of about 3 mm or less, for example, 2.5 mm or 2 mm.

Thus, the second fairing section can be produced from strip material, for example, a fiber reinforced plastic layer structure (for example, a glass fiber reinforced polymer) or a forming-optimal process for for example, thermoplastic-based fiber reinforced plastics or also non-reinforced plastics. Further, the second fairing section is relatively flexible in its configuration and choice of material. Having a wall thickness of approx. 3 mm or less, the second fairing section can thus follow a sheet deformation (compression along an axis between trailing and leading edge, expansion along an axis of the max profile height between suction and pressure side). The second fairing section can be stabilized by fastening points along the profile contour. Further, the second fairing section is relatively tolerant to manufacturing inaccuracies with respect to the desired contour, wherein the desired contour can then be adjusted with appropriate fastening.

According to an embodiment, one or more of the fairing sections are formed of an electrically non-conductive material. Preferably, non-conductive materials would be used for the second fairing section. Conductive plastics such as fiber reinforced plastics would appear attractive for lightning strikes, but would not withstand their load. Metals would have to include a correspondingly high wall thickness of 4 mm or 6 mm or greater due to their attractiveness for lightning strikes, depending on the location of the coupling regions, and thus be relatively mass-intensive, which would be more of a disadvantage compared to non-conductive plastics. The first metal section, which is for example way smaller than the second fairing section, is preferably made of metal as described above.

According to an embodiment, a sealing between two fairing sections and/or between a fairing section and a surface of the rotor blade segments is formed by a deformable material, for example, a material that prevents moisture absorption, in particular the sealing is formed by closed pore cell rubber. A deformable material, for example, closed-pore cellular rubber, is suitable for sealing both fairings to each other and to the rotor blade outer shell. Such material reacts deformably and smoothly to compression, withstands pressure and prevents moisture absorption.

According to an embodiment, the fairing is connected to a lightning protection system via screws or threaded bolts, wherein the screws or threaded bolts serves as lightning receptors. According to this embodiment the fairing is attached to an existing lightning protection structure of the rotor blade, preferably to metallic threads that are connected to a lightning protection system. Thus, the required mounting means, for example, threaded bolts, for fastening the fairing could also be used for catching lightning if required to avoid impacts into the bolt connections. Fasteners configured as receptors preferably are formed and arranged such that electrical currents are conducted via end faces, wherein a conduction of lightning currents exclusively via the threads is avoided.

According to an embodiment, the fairing is firmly connected to mounting tabs of metal sheets, the metal sheets being arranged between the connection ends of the segments, and the mounting tabs being bent towards the middle between the two segments or being bent away from the middle between the two segments over edges of the connection ends. For example, the mounting tabs are provided with eyelets for attachment of the fairing or the fairing sections respectively. Tabs bent towards the middle provides that lightning receptors, for example, (receptor) screws, are arranged in the division area or brought towards the middle of the division area. Tabs bent away from the middle has the advantage that screws for coupling the fairing to the segments could be arranged on or very near to a seal between the fairing and the rotor blade segments, thus a better sealing is possible by a better compression of the sealing.

According to a further aspect, a method of joining two rotor blade segments of a wind turbine rotor blade is disclosed, the method including the steps:

providing a fairing section of the fairing on one of the rotor blade segments, screwing together the rotor blade segments at a division area of the wind turbine rotor blade via connecting elements, wherein a gap is formed between the two connection ends, sliding the fairing section over the division area in order to cover the gap and the connection elements, providing a further fairing section of the fairing, and coupling the fairing sections to form the entire fairing, such that the gap and the connecting elements are covered.

The method essentially enables the above mentioned functions, effects and advantages. The method, respectively shoring to the rotor blade of the described fairing, enables for example a simple plug and screw mounting. The described fairing sections can be fastened with screws via specially distributed fastening lugs on an existing rotor blade system structure, in particular connected to the lightning protection system.

The above described features and embodiments with regard to the first aspect similarly apply to the described method.

According to an embodiment, the fairing includes only two fairing sections as mentioned above, wherein a first fairing section includes the leading edge and a second fairing section the trailing edge.

According to the method described above, before joining the segments together, one of the fairing sections is slid or pulled over one of the segments. This fairing section (second fairing section as named above) includes for example the leading edge and is for example way bigger than the other fairing section (first fairing section as named above) as described above. This second fairing section can be pushed onto one of the blade segments away from the division area and for example remains there until the assembly of the rotor blade segments, for example, via the longitudinal bolt connections, is completed. This means the second fairing section is only attached to the rotor blade segment in a form-fit manner, wherein it can be slid along the longitudinal axis of the rotor blade segment. Thereby, the fairing section is attached or placed on the segment in such a way that it does not affect or interfere with the subsequent joining of the two segments in a negative way, or only to a negligible extent. Not providing this second fairing section at this stage would make it more difficult to mount the second fairing section (or the whole fairing respectively) after having connected the rotor blade segments together. The second fairing would have to be more flexible. After that the two rotor blade segments are brought together and mechanically connected to each other, for example, by screwing the screw bolts as described above. After that, the second fairing section is slid along the longitudinal axis of the rotor blade into the division area of the rotor blade segments. Then, the respective first fairing section is provided, for example, slid or pulled over the rotor blade segments at the division area, in particular in a direction transverse to the longitudinal axis. Thus, this further fairing section is slid over the gap and fastened there in the fastening lugs via screw assembly. The fairing sections are connected together and in order to build the entire fairing and cover the gap and the connecting elements.

This first fairing section can be fastened by sliding it under the second fairing section so that the second fairing section overlaps the first fairing section. A corresponding seal, as mentioned above, may be pressed there.

Alternatively, if the second fairing section on the rotor blade segment interferes with the assembly of joining both rotor blade segments, the second fairing section can also simply be slipped over the leading edge of the segmentation gap after the rotor blade segments have been connected and fastened. The first fairing section can then be slipped over the trailing edge of the division gap.

It is noted that further elements/components can be arranged and mounted between the two segments before finally attaching the first fairing section.

For example, sleeve-shaped pressure pieces are arranged between the rotor blade segments, each of which is mounted on a connecting bolt.

For example, a plurality of metal sheets is provided, each metal sheet being arranged between a respective connection end and several pressure pieces. The metal sheets might form an electrically conductive connection between adjacent pressure pieces via a metal sheet.

For example, the metal sheets are electrically conductively connected to a lightning conductor system. For example, one or more metal sheets are connected to a lightning conductor of the first rotor blade segment and/or to a lightning conductor of the second rotor blade segment.

For example, the metal sheets include tabs, lugs and/or eyelets for the fairing, for example, the fairing sections, to be connected to the metal sheets and thus the rotor blade segments.

Further advantages, features and functions are given in the following embodiments of the disclosure, which are explained in connection with the figures. Identical, similar or similarly acting elements are provided with the same reference signs in the figures. Not necessarily all shown and described elements are provided with reference signs for sake of clarity and visibility.

BRIEF DESCRIPTION OF THE DRAWINGS

The invention will now be described with reference to the drawings wherein.

DESCRIPTION OF THE PREFERRED EMBODIMENTS

Figure 1:
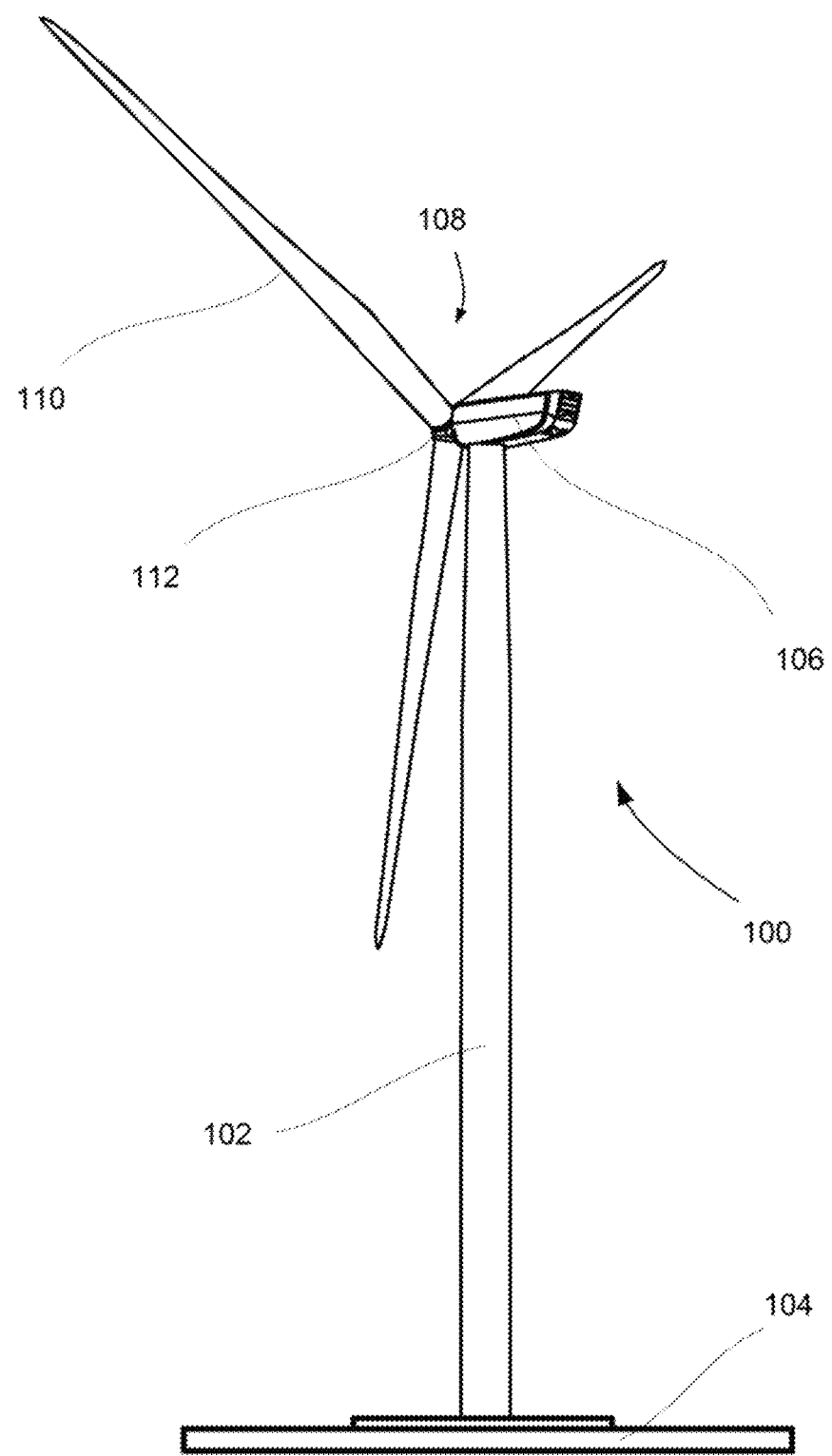
FIG. 1 shows a schematic view of a wind turbine.

FIG. 1 shows a schematic view of a wind turbine 100, which includes a tower 102. The tower 102 is fixed to the ground via a foundation 104. At one end of the tower 102 opposite to the ground a nacelle 106 is rotatably mounted. The nacelle 106, for example, includes a generator which is coupled to a rotor 108 via a rotor shaft (not shown). The rotor 108 includes one or more (wind turbine) rotor blades 110, which are arranged on a rotor hub 112.

During operation, the rotor 108 is set in rotation by an air flow, for example wind. This rotational movement is transmitted to the generator via the rotor shaft and, if necessary, a gearbox. The generator converts the mechanical energy of the rotor 108 into electrical energy.

Figure 2:
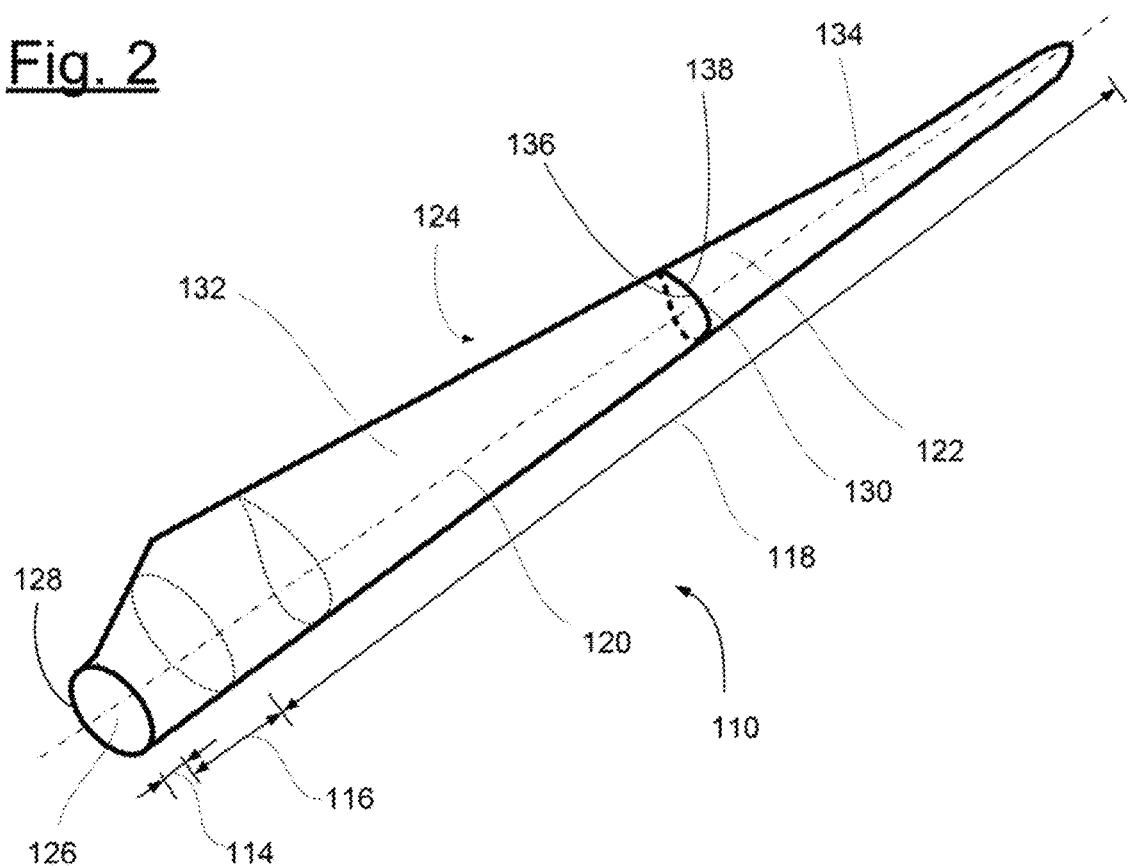
FIG. 2 shows a schematic view of a split rotor blade with two rotor blade segments.

FIG. 2 shows a wind turbine rotor blade 110. The rotor blade 110 has the shape of a conventional rotor blade and has a rotor blade root area 114 facing the rotor hub 112. The rotor blade root area 114 typically has an essentially circular cross-section. The rotor blade root area 114 is followed by a transition area 116 and a profile area 118 of rotor blade 110. The rotor blade 110 has a pressure side 122 and an opposite suction side 124 with respect to a longitudinal extension direction 120 (also main extension direction). The rotor blade 110 is essentially hollow inside.

In the rotor blade root area 114 a rotor blade connection end 126 with a flange connection 128 is provided, via which the rotor blade 110 is mechanically connected to a pitch bearing or an extender.

The rotor blade 110 includes a division area 130 where a blade root-side rotor blade segment 132 (first rotor blade segment) and a blade tip-side rotor blade segment 134 (second rotor blade segment) are connected to each other. For this purpose, both segments 132, 134 each include a segment connection area 136, 138 (also named connection ends). The rotor blade 110 is thus a split or segmented rotor blade as described above. Each connection end 136, 138 has a multitude of sleeves or bushings 140, 142, which are arranged according to the profile (in circumferential direction) and include internal threads for the reception of screw bolts, also called bearing bolts or connecting bolts. For example, the first bushings 140 include left-hand threads (first internal threads) and the second bushings 142 right-hand threads (second internal threads) or vice versa. A connection end 136, 138 is realized for example as a flange insert, which is inserted into a production mold for the manufacture of the rotor blade 110. However, it is also conceivable that no flange insert is provided and the bushings are embedded and laminated directly into the rotor blade half shells. The bushings are steel sleeves, for example.

Figure 3:
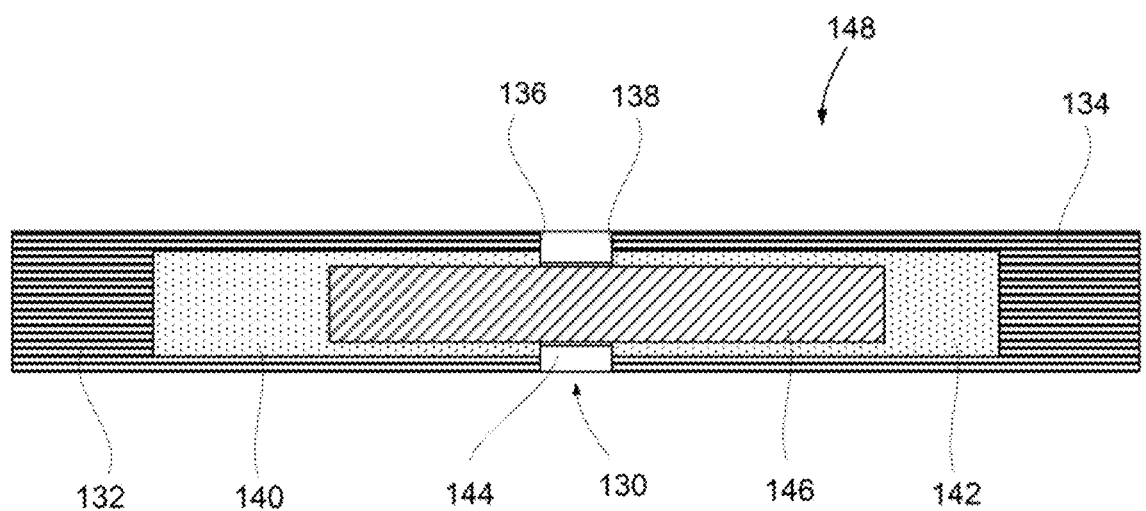
FIG. 3 shows a schematic sectional view of a bolt connection of the two rotor blade segments.

The connection of both rotor blade segments 132, 134 will be described in more detail using a single bolt connection as an example with the help of FIG. 3, which shows a schematic sectional view in the division area 130 of the two connected rotor blade segments 132, 134. The first connection end 136 of the first rotor blade segment 132 includes a multitude of first bushings 140 as described above. The second connection end 138 of the second rotor blade segment 134 includes a number of second bushings 142. A connecting bolt 146 is screwed into each pair of aligned first and second bushings 140, 142. This bolt 146 connects the two connection ends 136, 138 and thus the two rotor blade segments 132, 134 mechanically. In addition, a pressure piece 144 is clamped between the two connection ends 136, 138 per bolt connection 148.

Figure 4:
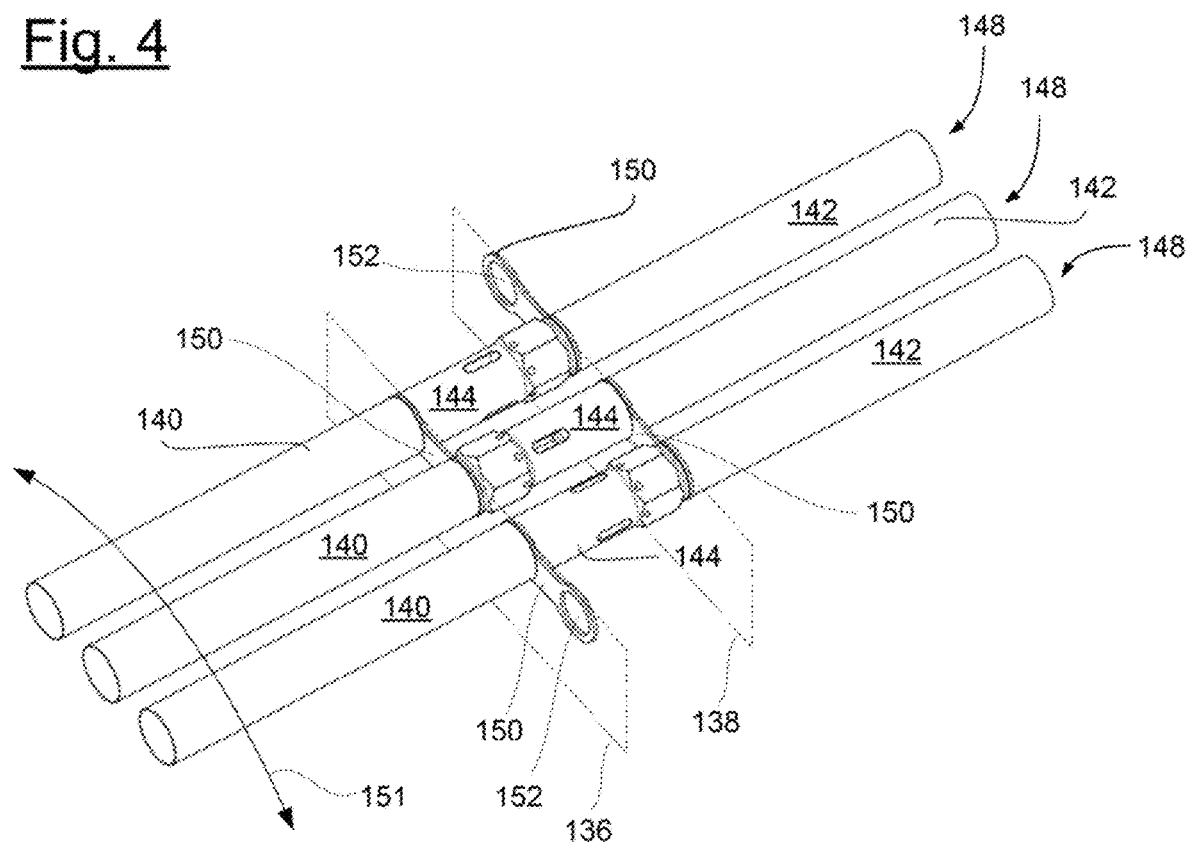
FIG. 4 shows a perspective view of bolt connections of a wind turbine rotor blade.

FIG. 4 shows three bolt connections 148 of a segmented wind turbine rotor blade 110. Different to the schematically described embodiment of FIG. 3, between each connection end 136, 138 of the blade 110 and the pressure pieces 144 metal sheets 150 are clamped (also named clamping sheets), after screwing the segments 132, 134 together via the bolts 146. The metal sheets 150 are arranged along the circumference 151 of the blade 110 on the suction and pressure sides 124, 122. Each metal sheet 150 is electrically conductive and couples two pressure pieces 144 in an electrically conductive manner. In the shown embodiment, each metal sheet 150 includes two openings 152 (recesses). Through the openings 152 the connection bolts 146 can be passed. The pressure pieces 144 correspondingly are electrically conductive, too, and formed by a respective metal for example. The metal sheets 150 are configured and mounted between the segments 132, 134 and pressure pieces 144 such that no contact is established to the bolts 146.

One or more metal sheets 150, which are associated to the first connection end 136 or the first rotor blade segment 132 (root segment), are coupled to a first lightning conductor, for example, a cable, in an electrically conductive manner (not shown). Similarly, one or more metal sheets 150, which are associated to the second connection end 138 or the second rotor blade segment 134 (tip segment), are coupled to a second lightning conductor, for example, a cable, in an electrically conductive manner (not shown). The lightning conductor cables for example are part of a lightning protection system (not shown). For the connection to the lightning conductor system, the metal sheets 150 have one or more interfaces, for example, eyelets.

Figure 5:
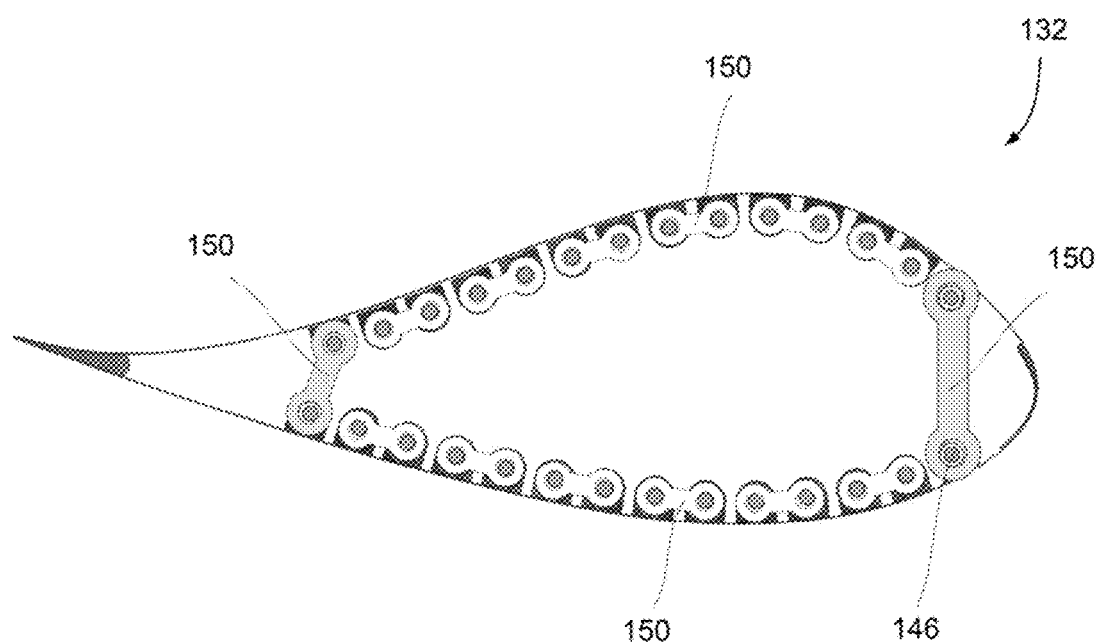
FIG. 5 shows a sectional view of a segmented wind turbine rotor blade at a division area.

FIG. 5 shows exemplarily a cross section of a rotor blade segment 132 at the division area 130 with the metal sheets 150. Some or all of the metal sheets 150 can be part of the lightning protection system of the rotor blade 110.

Figure 6:
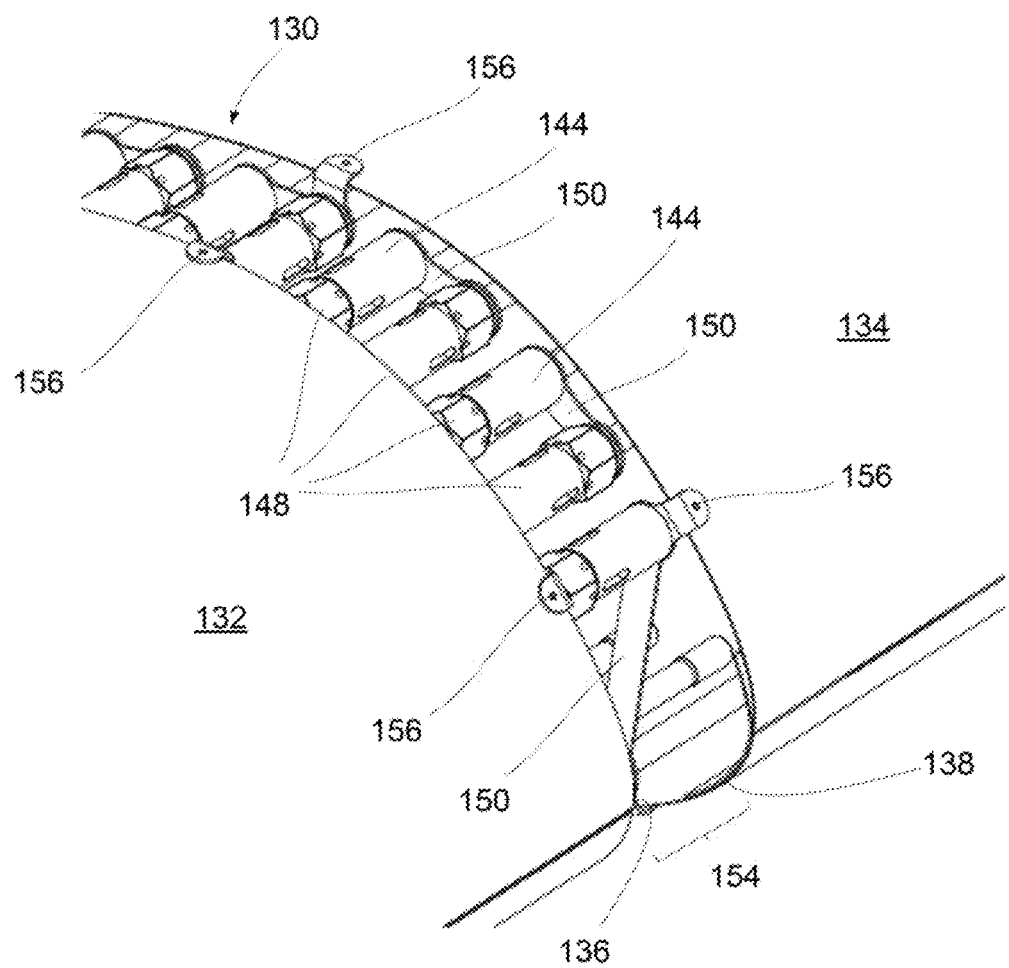
FIGS. 6 to 18 show different views of a segmented wind turbine rotor blade and a fairing according to an embodiment of the disclosure.

FIG. 6 shows a perspective view of a rotor blade 110 according to an embodiment. As can be seen, at the division area 130 there is formed a gap 154 between the connection ends 136, 138 of the rotor blade segments 132, 134. In order to cover the gap 154 and the elements in between, that is, the bolt connections 148, pressure pieces 144 and the like, the gap 154 is covered by a fairing, as will be described below. In order to attach such fairing, some of the metal sheets 150 include tabs 156, which serve as mounting points. Thus, the fairing is connected to the lightning protection system.

Figure 7:
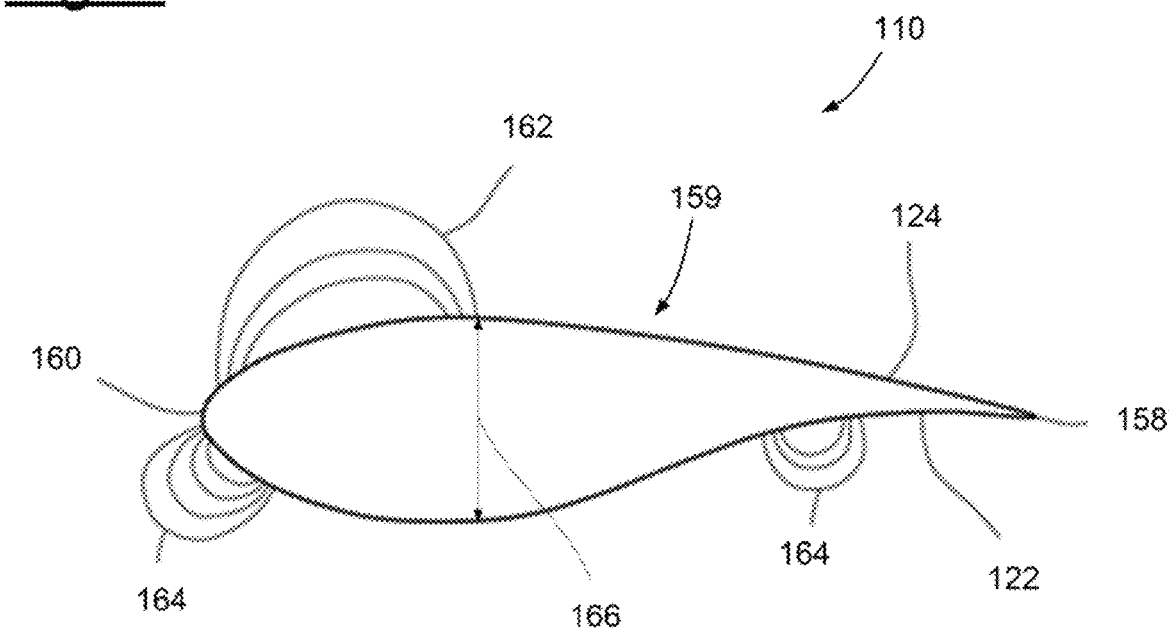

FIG. 7 schematically illustrates a profile 159 of the wind turbine rotor blade 110 in the division area 130 and shows three main or essential pressure regions during operation of the rotor blade 110. The rotor blade 110 has a trailing edge 158 and a leading edge 160. On the suction side 124 there is a negative pressure region 162 close to the leading edge 160. On the pressure side 122, there are two main overpressure regions 164, one of them close to the leading edge 160 and one of them between the trailing edge 158 and the maximum profile height 166.

Following these essential pressure regions 162 and 164, the inventors identified three length sections a, b, c along the profile 159 (profile contour or circumference 151), in which a fairing with two separate fairing sections should be separated (see FIG. 8A) and/or coupled together. Length section "a" extends on the suction side 124 between the trailing edge 158 and a location of the maximum profile height 166. Length section "c" is located on the pressure side between the trailing edge 158 and 80% chord length 167 measured from the leading edge 160. Length section "b" is located on the pressure side 122 in an area between 15% and 65% chord length 167.

Figure 8A:
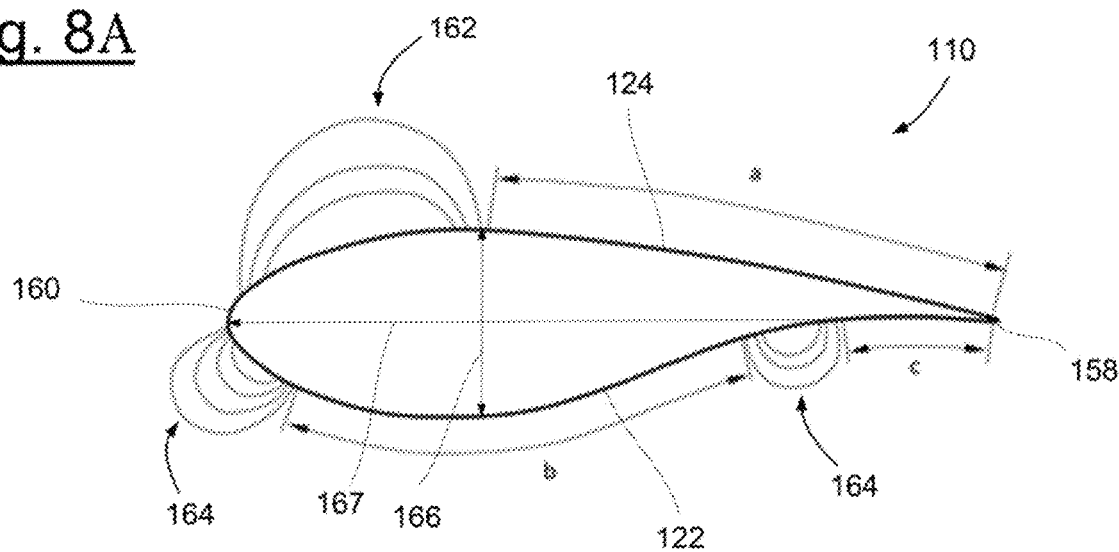
Figure 8B:
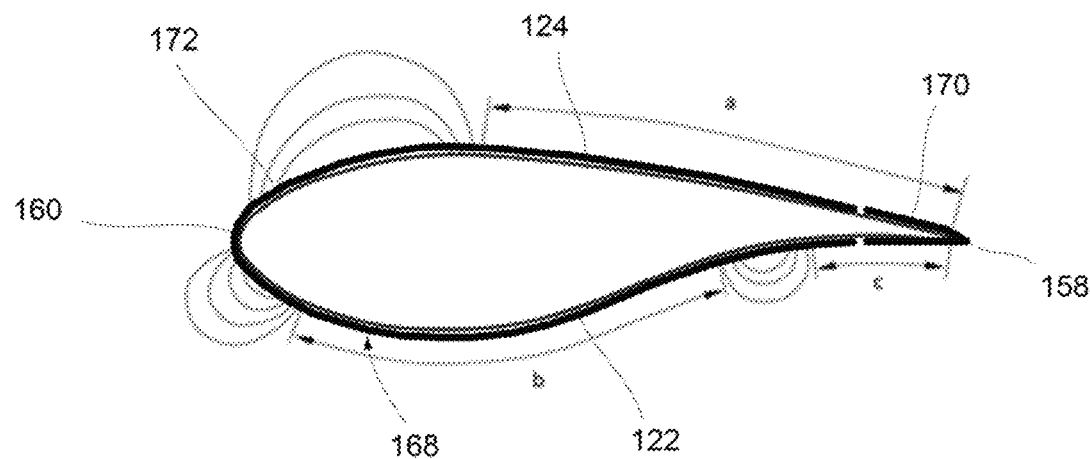
Figure 8C:
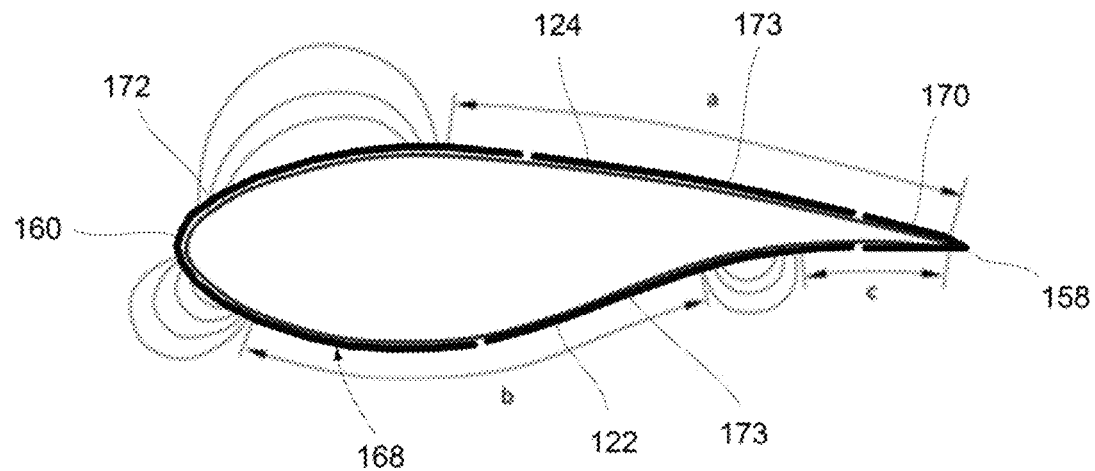

FIGS. 8B and 8C show embodiments with possible locations for separating the fairing 168. In FIG. 8B the fairing consists of two sections, a first section 170 at the trailing edge and a second section 172 at the leading edge 160. In FIG. 8C the fairing consists of four sections. Additionally to the first section 170 and the second section 172 two intermediate sections 173 are provided, each one on the suction side 124 and the pressure side 122. In both embodiments the separation points are located in at least two of the length sections a, b or c.

Figure 9:
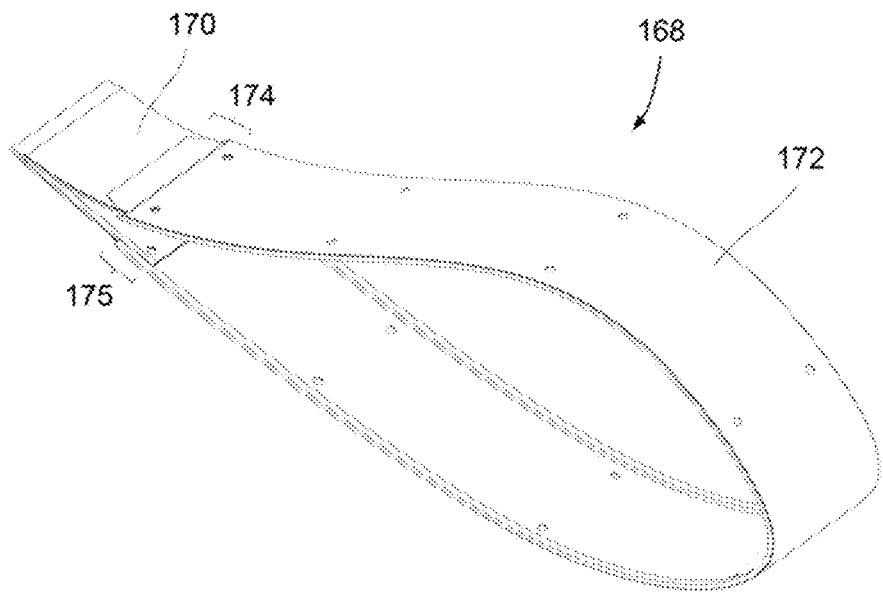

FIG. 9 shows a fairing 168 which includes two separate fairing sections, namely a first fairing section 170 and a second fairing section 172. The first fairing section 170 and the second fairing section 172 are formed to be coupled together and to be mounted onto the rotor blade segments 132, 134. The fairing 168 is formed to essentially maintain the aerodynamic structure of the rotor blade 110, that is, the outer contour is essentially maintained. The first fairing section 170 could be named trailing edge fairing and the second fairing 172 could be named leading edge fairing. The fairing 168 forms a closed ring along the circumference 151 of the blade 110, that is, the profile 159. The fairing sections 170 and 172 are formed such that coupling regions 174 and 175, in which ends of the first and second fairing sections 170 and 172 overlap each other, are placed on the suction side 124 and the pressure side 122 in sections a and c as described above (s. FIGS. 8A to 8C).

The first fairing section 170 is much smaller than the second fairing section, for example, the first fairing section 170 amounts to up to 20% of the contour length of the profile 159, whereas the second fairing section 172 amounts to 80% of the contour length of the profile 159. This first fairing section 170 is produced by injection molding and is made of a non-conductive material. The second fairing section 172 is made from a fiber-reinforced plastic material and has a wall thickness of approximately 2 mm. Further, both fairing sections 170 and 172 are made of electrically non-conductive material.

Figure 10:
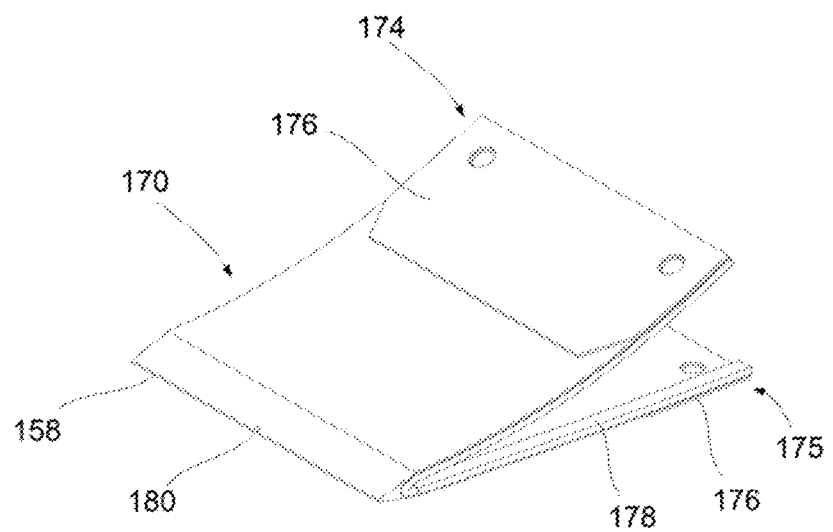
Figure 11:
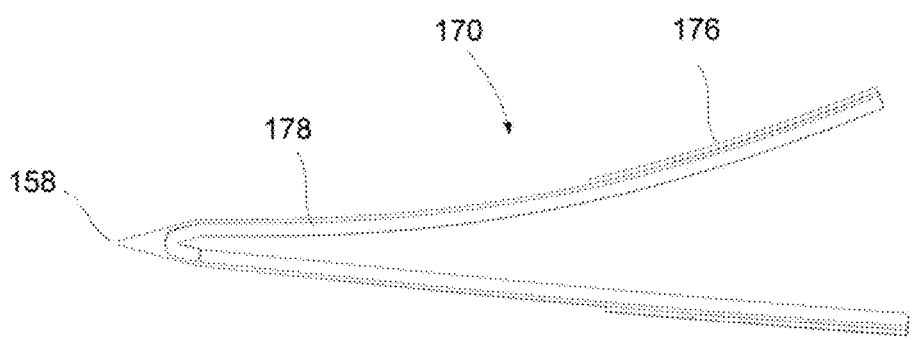

FIG. 10 shows the first fairing section 170. In the coupling regions 174 and 175, the first fairing section 170 includes outer sealings 176, which are arranged flat on the outer side of the first fairing section 170. The first fairing section 170 also has an inner sealing 178 that runs along the inner edges of the first fairing section 170 (see also FIG. 11 showing a sectional view of the first fairing section 170). The first fairing section 170 is coupled with the second fairing section 172 such that the second fairing section 172 overlaps the first fairing section 170. In between, the outer sealing 176 is arranged, in particular pressed in a finally coupled state, to seal both fairing sections 170 and 172 to each other. The inner sealing 178 is formed such that the first fairing section 170 is sealed to the rotor blade segments 132, 134. In other words, the first fairing section 170 surrounds at least partially (at the edges) both rotor blade segments 132, 134, wherein the inner sealing is arranged in between, in particular pressed in between. The sealings 176, 178 are made of closed cell rubber.

Figure 12:
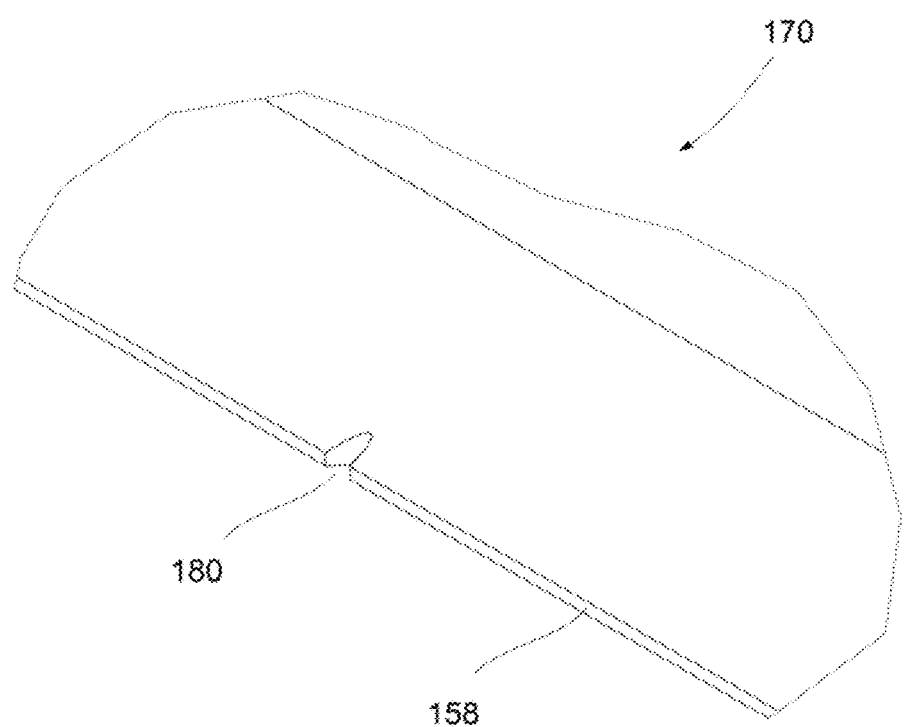
Figure 13:
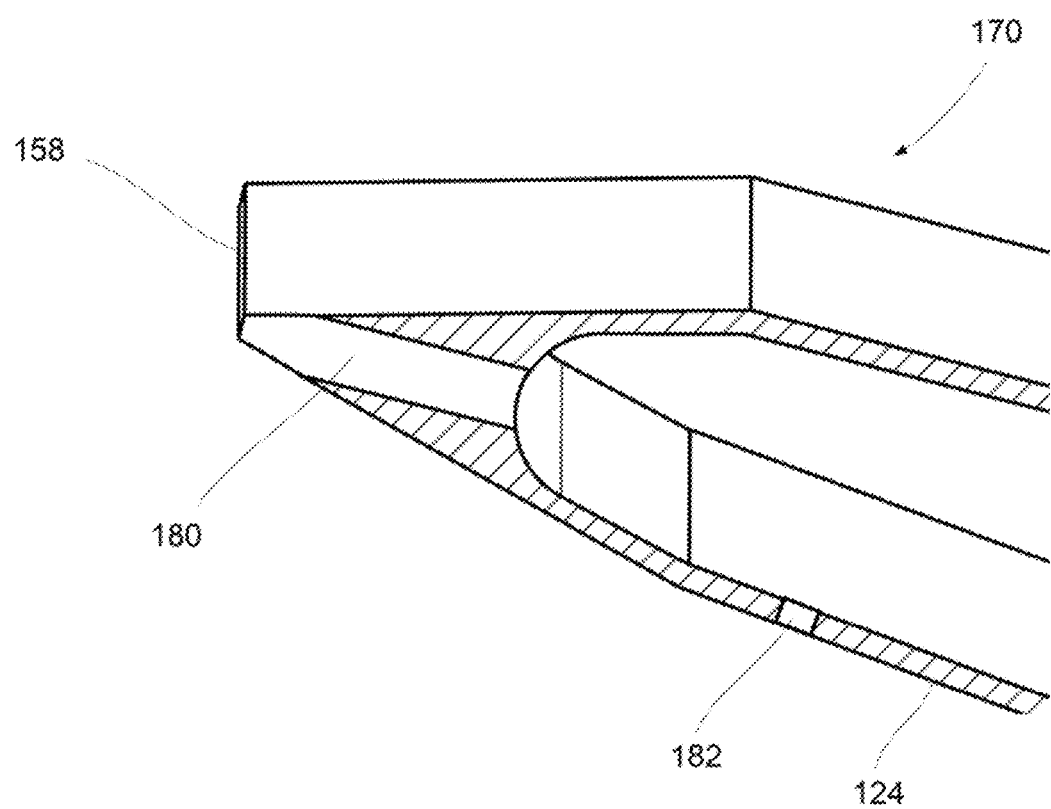

FIG. 12 shows detail view "Z" of FIG. 10 and FIG. 13 shows a sectional view of the detail shown in FIG. 12. As can be seen, at the trailing edge 158 the first fairing section 170 includes a first drainage opening 180, which opens at the trailing edge 158. Alternatively or additionally, a drainage opening 182 can be provided at the suction side 124 of the first fairing section 170.

Figure 14:
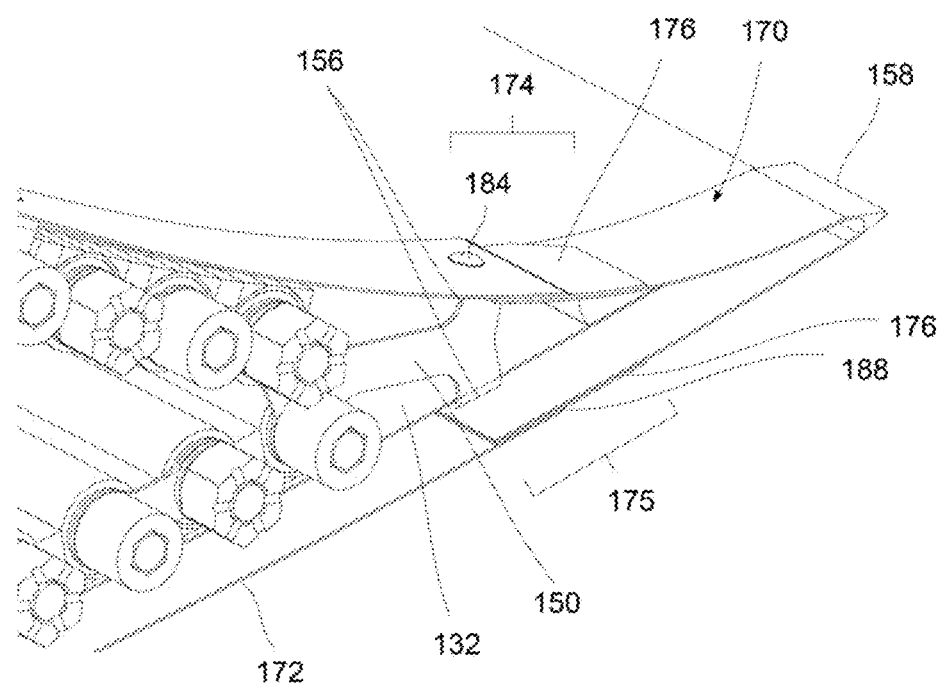
Figure 15:
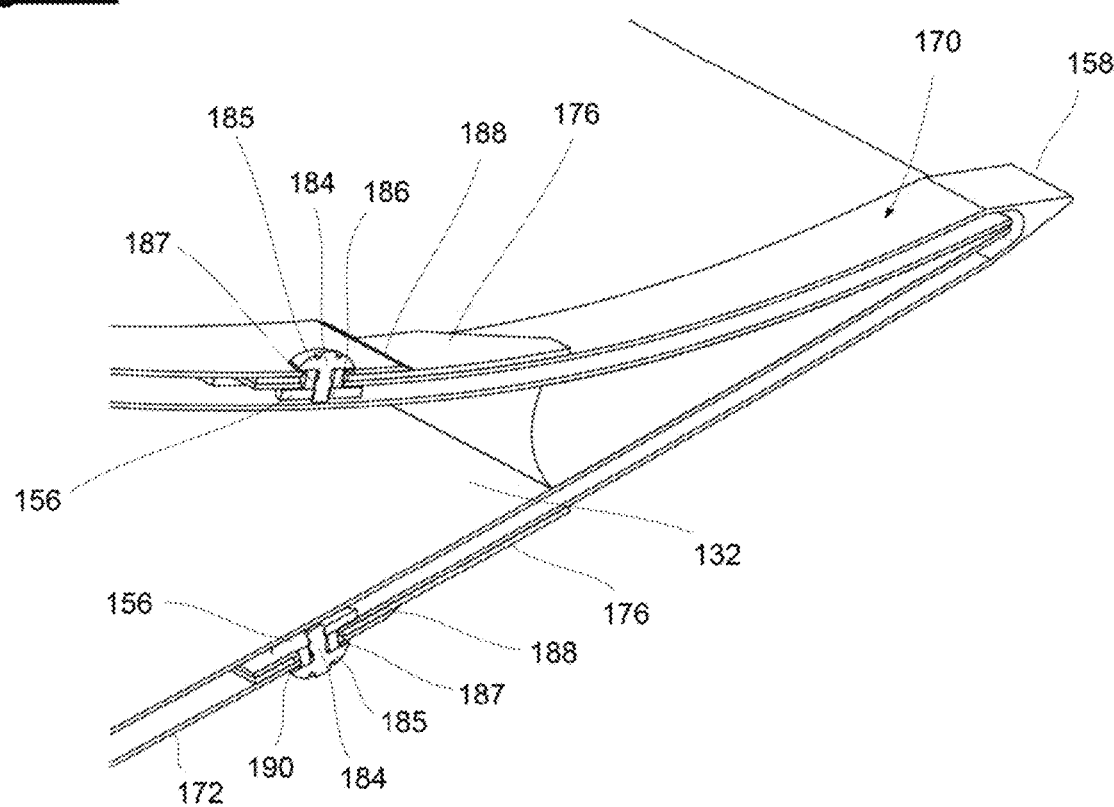

FIGS. 14 and 15 detail the connection of the two fairing sections 170 and 172 to each other as well as to a rotor blade segment 132, 134. FIG. 14 shows a cross section through the fairing 168, whereas FIG. 15 shows a cross section through a mounting point. In the coupling regions 174, 175 the two fairing sections 170, 172 are screwed together via screws 184 (generally: connections means). The two fairing sections 170, 172 are screwed onto tabs 156 of the metal sheet 150 (which can also be referred to as a part of an existing system structure of the blade 110, in particular the lightning protection system). As can be seen from FIG. 15, the tabs 156 include openings or eyelets 186 for the screws 184 to be mounted to the segments 132, 134 of the blade 110. The screws 184 serve as lightning receptors in the shown embodiment. Further, an electrically conductive inner ring element 187 (cylindrical element) is arranged and clamped between a screw head 185 of screw 184 and the metal sheet 150, that is, the tab 156. This ensures that an electrically conductive connection is established from the screw head 185 to the metal sheet 150 and lightning currents are thus not only conducted via the screw shaft or screw thread, but in particular over the inner end face of the screw head 185 and the inner metal ring element 187. A sealing 190, for example, a sealing ring, can be provided between the screw head 185 and the outermost side of the second fairing section 172.

It is noted that the tabs 156 are bent away from a middle of the division area 130 with respect to the longitudinal direction of the blade 110. In particular, they are bent over edges of the segments 132, 134 at the connection ends 136, 138. As an alternative, the tabs 156 may also be bent towards the middle of the division area 130.

FIGS. 14 and 15 also show that the second fairing section 172 overlaps the first section 170 such that a step 188 is formed downwardly towards the trailing edge 158. In other words, the step 188 is formed such that the air flows downwardly during operation of the wind turbine rotor blade 110. The step 188 essentially runs transverse to an airflow during operation of the blade 110. The step 188 optionally has a height of 2 mm or less (that is, a wall thickness of the second fairing section 172). Further optionally, the step 188 tapers with an angle at 15 degrees or less. Optionally, also the trailing edge 158 of the first fairing section may taper with an angle at 15 degrees or less.

Figure 16:
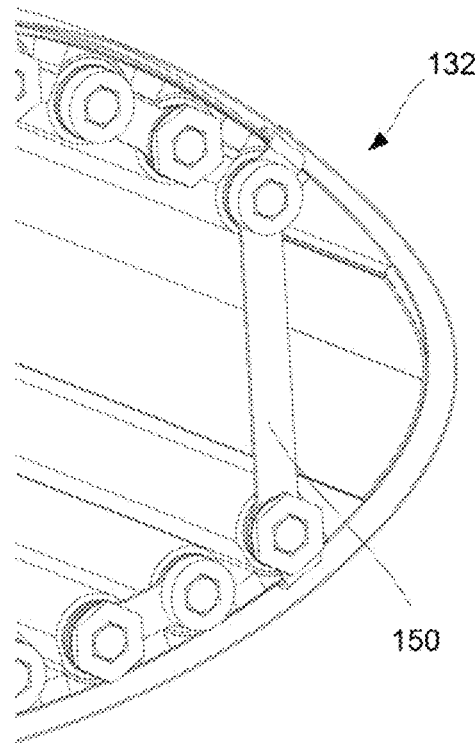
Figure 17:
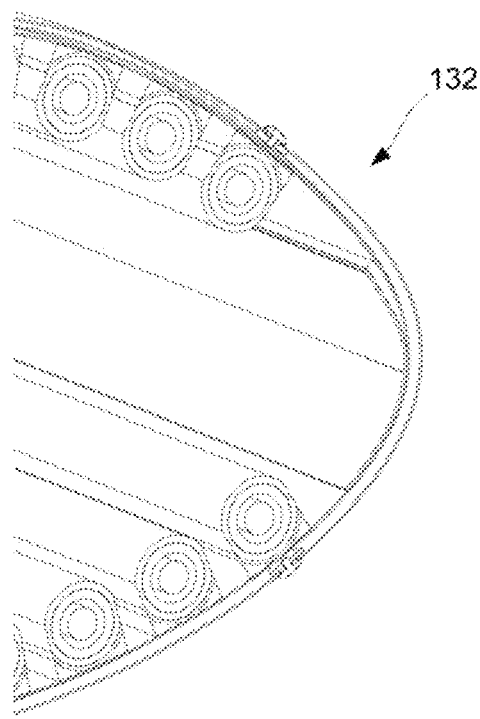
Figure 18:
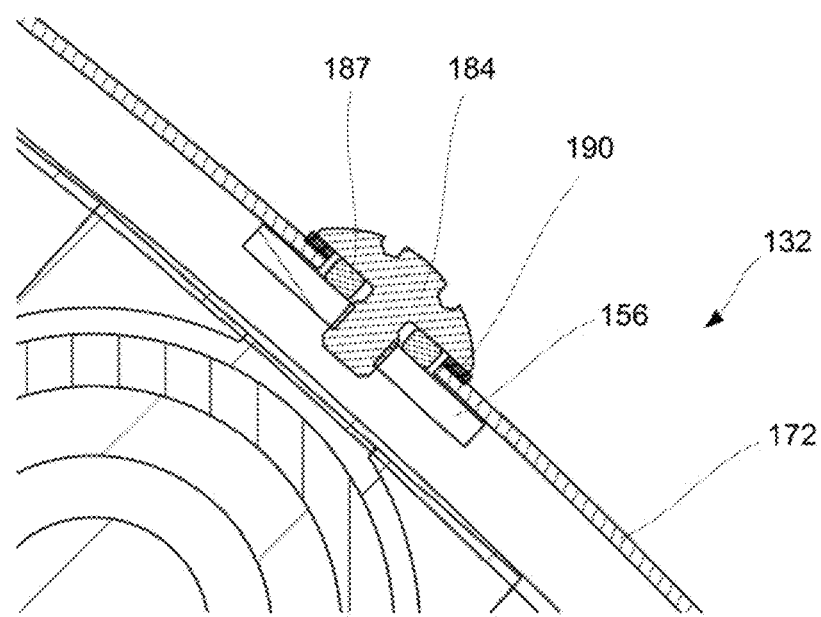

Similarly, FIGS. 16 to 18 show a connection of the second fairing section 172 to a rotor blade segment 132, 134. The above mentioned details similarly apply.

Figure 19:
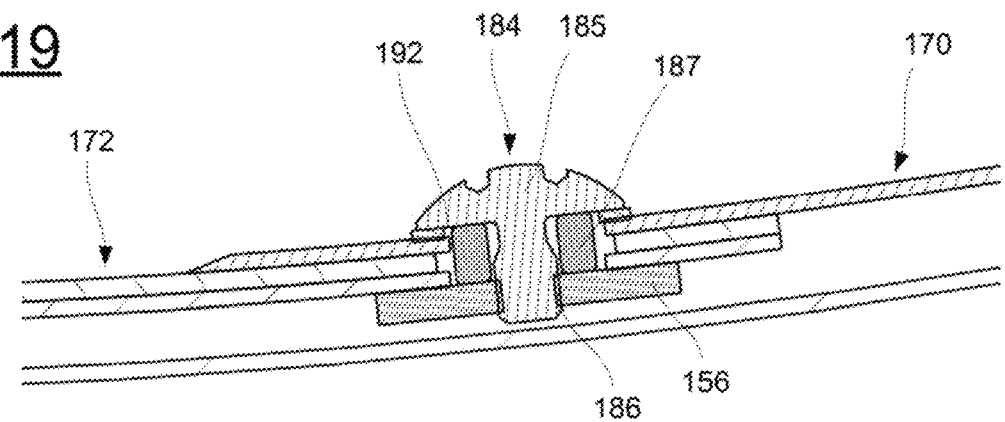
FIGS. 19 and 20 show different mounting options for a fairing to be connected to a wind turbine rotor blade.
Figure 20:
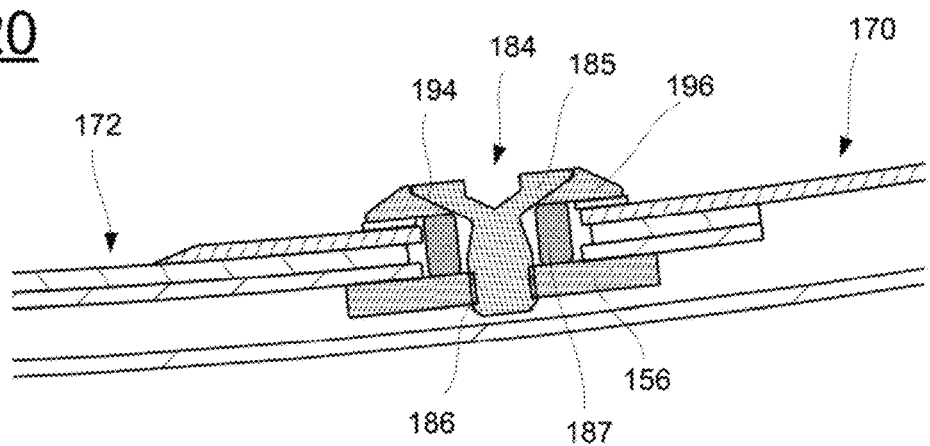

FIGS. 19 and 20 detail two variants of a connection of the two fairing sections 170, 172. FIG. 19 shows an embodiment with a screw 184 as a lightning receptor with a high structure, which is exemplarily used in the embodiment shown in FIGS. 14 and 15. Here, the screw head 185 has a flat end face 192, which lies on the inner metal ring element 187 to clamp it against the metal sheet 150, that is, a counter face of the tab 156. FIG. 20 shows an embodiment with a screw 184 as a lightning receptor with a low structure, wherein the screw 184 has a flat outer side, wherein an inner end face 194 is angled and lies on a metal ring element 196. The metal ring element 196 lies flat on the inner metal ring element 187 and is clamped again against the metal sheet 150.

The embodiments as described above enable the functions, effects and advantages as listed in the introductory part of this writing.

Some of the above described features can be omitted, for example, as indicated in the introductory part of the present disclosure.

Figure 21:
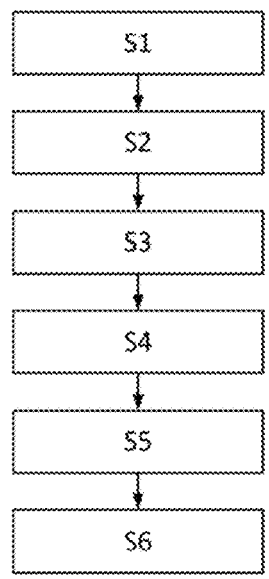
FIG. 21 shows a flow chart for a method of joining two rotor blade segments of a wind turbine rotor blade according to an embodiment of the disclosure; and, FIGS. 22 to 24 show different mounting steps according to the method of joining.
Figure 24:
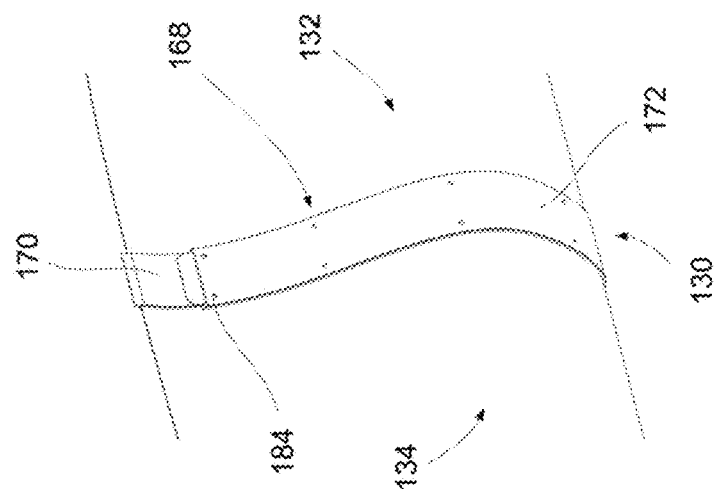
Figure 23:
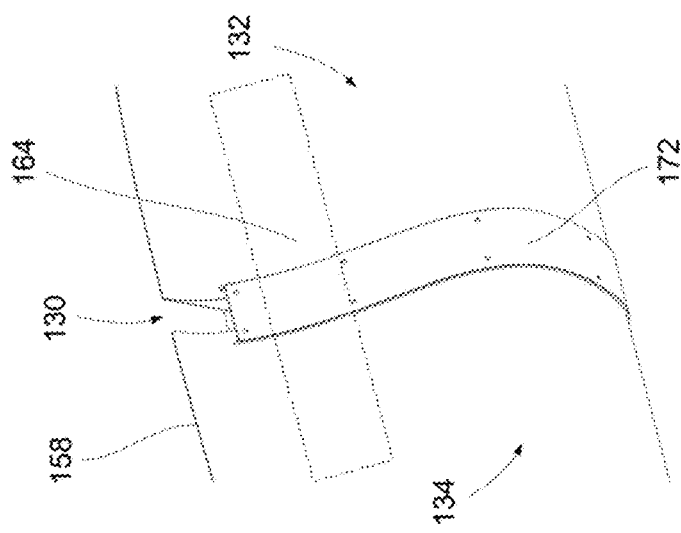

In the following, a method of joining to rotor blade segments 132, 134 and mounting a fairing 168, as described above, is described with the aid of FIGS. 21 to 24. FIG. 21 shows a flow diagram and FIGS. 22 to 24 show the rotor blade 110 at different mounting steps.

The two rotor blade segments 132, 134 may already be prepared and provided to be mounted together, for example, arranged next to each other at a certain distance.

In a first step S1, the second fairing section 172 of the fairing 168 is provided and slid over one of the rotor blade segments along the longitudinal direction 120 (see FIG. 2), for example, the first segment 132. This is shown in FIG. 22.

Figure 22:
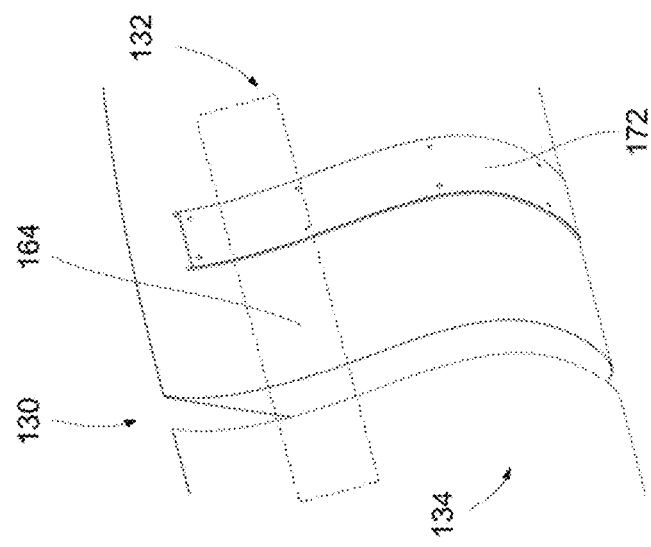

In a next step S2, the rotor blade segments 132, 134 are screwed together at the division area connecting elements via the bolt connections 148, wherein the gap 154 is formed between the two connection ends 136, 138 (see FIG. 22).

Next, in step S3 the second fairing section 172 is provided, for example, slid, over the division area 130 in order to cover the gap 154 and the connection elements, that is, the bolt connections 148 (see FIG. 23). At this step, the second fairing section 172 can be firmly connected to the segments 132, 134, for example, by screwing as described above.

Next, in step S4, the first fairing section 170 of the fairing 168 is provided and pulled over the trailing edge 158 and is slipped over the gap 154.

Next, in step S5, the first fairing section 170 and the second fairing section 172 are coupled, wherein the first fairing section 170 is fastened by sliding it under the second fairing section 172 in the coupling regions 174, 175, so that an overlap of the second fairing section 172 over the first fairing section 170 is created and the corresponding sealing 176 is pressed there.

Finally, in step S6 the fairing sections 170, 172 may be screwed together.

It is understood that the foregoing description is that of the preferred embodiments of the invention and that various changes and modifications may be made thereto without departing from the spirit and scope of the invention as defined in the appended claims.

REFERENCE SIGNS 100 wind turbine
102 tower
104 foundation
106 nacelle
108 rotor
110 rotor blade
112 rotor hub
114 rotor blade root area 116 transition area
118 profile area
120 longitudinal extension direction
122 pressure side
124 suction side
126 rotor blade connection end
128 flange connection
130 division area
132 first rotor blade segment
134 second rotor blade segment
136 first connection end (root side)
138 second connection end (tip side)
140 first bushing
142 second bushing
144 pressure piece
146 connection bolt
148 bolt connection
150 metal sheet
151 circumference
152 opening
154 gap
156 tab
158 trailing edge
159 profile
160 leading edge
162 negative pressure area
164 overpressure area
166 profile height
167 chord length
168 fairing
170 first fairing section
172 second fairing section
173 intermediate fairing section
174 coupling region
175 coupling region
176 outer sealing
178 inner sealing
180 first drainage opening
182 second drainage opening
184 screw
185 screw head
186 eyelet
187 inner metal ring element
188 step
190 sealing
192 flat inner end face
194 angled inner end face
196 metal ring element
S1-S6 steps

What is claimed is:

1. A wind turbine rotor blade comprising:
a first rotor blade segment having a first connection end;
a second rotor blade segment having a second connection end;
said first rotor blade segment and said second rotor blade segment conjointly defining a division area of the wind turbine rotor blade;
a plurality of connecting elements;
said first rotor blade segment and said second rotor blade segment being configured to be firmly interconnected at said first connection end and said second connection end at said division area via said plurality of connecting elements, wherein said first connection end and said second connection end conjointly define a gap formed therebetween;
a fairing attached to said first rotor blade segment and said second rotor blade segment at the division area, wherein said fairing covers said gap and said plurality of connecting elements;
said fairing being divided into at least two separate fairing sections each having a coupling region;
the wind turbine rotor blade having a suction side, a pressure side, a leading edge, and a trailing edge;
said at least two fairing sections being coupled together at said coupling regions at least at one of the pressure side and the suction side of the wind turbine rotor blade;
said coupling regions of said at least two separate fairing sections being spaced apart from the trailing edge or leading edge;
said fairing running along an entirety of a profile contour of the wind turbine rotor blade; and,
said at least two fairing sections overlapping in said coupling regions such that a step is formed transverse to a flow direction of air during an operation of the wind turbine rotor blade, wherein air flows downwardly over said step during operation of the wind turbine rotor blade.

2. The wind turbine rotor blade of claim 1, wherein said fairing sections each have an essential pressure region and said coupling regions are each arranged outside of corresponding ones of said essential pressure regions.

3. The wind turbine rotor blade of claim 2, wherein said essential pressure regions are disposed close to the leading edge on the suction side, close to the leading edge on the pressure side, and between the trailing edge and a maximum profile height on the pressure side.

4. The wind turbine rotor blade of claim 1, wherein at least one of:
said step has a height of 3 millimeters or less; and,
said step tapers with an angle of 15 degrees or less.

5. The wind turbine rotor blade of claim 1, wherein said at least two fairing sections include a first fairing section comprising the trailing edge.

6. The wind turbine rotor blade of claim 5, wherein the first fairing section comprises the trailing edge and is made from metal.

7. The wind turbine rotor blade of claim 5, wherein the first fairing section comprises the trailing edge and is made from a metal casting or metal cast element.

8. The wind turbine rotor blade of claim 5, wherein the trailing edge tapers with an angle of 15 degrees or less.

9. The wind turbine rotor blade of claim 5, wherein said first fairing section defines a drainage opening.

10. The wind turbine rotor blade of claim 5, wherein said fairing consists essentially of said first fairing section and a second fairing section; said first fairing section includes the trailing edge and said second fairing section includes the leading edge.

11. The wind turbine rotor blade of claim 10, wherein said fairing defines a fairing length; and, said second fairing section has a second section length which accounts for at least 80% of said fairing length.

12. The wind turbine rotor blade of claim 1, wherein at least one of said two fairing sections is formed of an electrically non-conductive material.

13. The wind turbine rotor blade of claim 1 further comprising a sealing between at least one of said two fairing sections and a first fairing section of said two fairing sections; and, wherein said first rotor blade segment and said second rotor blade segment have a surface formed by a deformable material.

14. The wind turbine rotor blade of claim 1, wherein said fairing is connected to a lightning protection system via at least one of screws and threaded bolts; and, wherein said at least one of screws and threaded bolts serve as lightning receptors.

15. The wind turbine rotor blade of claim 1 further comprising:
   a plurality of metal sheets having mounting tabs;
   said fairing being firmly connected to said mounting tabs of said metal sheets;
   said metal sheets being arranged between said first connection end of said first rotor blade segment and said second connection end of said second rotor blade segment; and,
   said mounting tabs being bent toward a middle between said first rotor blade segment and said second rotor blade segment or being bent away from the middle over edges of said first connection end and said second connection end.

16. The wind turbine rotor blade of claim 14 further comprising:
   a plurality of metal sheets having mounting tabs;
   said fairing being firmly connected to said mounting tabs of said metal sheets;
   said metal sheets being arranged between said first connection end of said first rotor blade segment and said second connection end of said second rotor blade segment; and,
   said mounting tabs being bent toward a middle between said first rotor blade segment and said second rotor blade segment or being bent away from the middle over edges of said first connection end and said second connection end.

17. The wind turbine rotor blade of claim 4, wherein said step has a height of 2.5 millimeters or less.

18. The wind turbine rotor blade of claim 4, wherein said step has a height of 2 millimeters or less.

19. A method of joining two rotor blade segments of the wind turbine rotor blade of claim 1; the method comprising:
   providing the second fairing section of the fairing on one of the first rotor blade segment and the second rotor blade segment;
   screwing together the first rotor blade segment and the second rotor blade segment at the division area of the wind turbine rotor blade via the connecting elements, wherein the gap is formed between the first connection end and the second connection end;
   sliding the second fairing section over the division area in order to cover the gap and the connecting elements;
   providing the first fairing section of the fairing; and,
   coupling the first fairing section and second fairing section to form the fairing.

* * * * *